Jan. 1, 1929.
G. C. SNYDER
VEHICLE
Original Filed Feb. 25, 1922  4 Sheets-Sheet 3
1,696,927
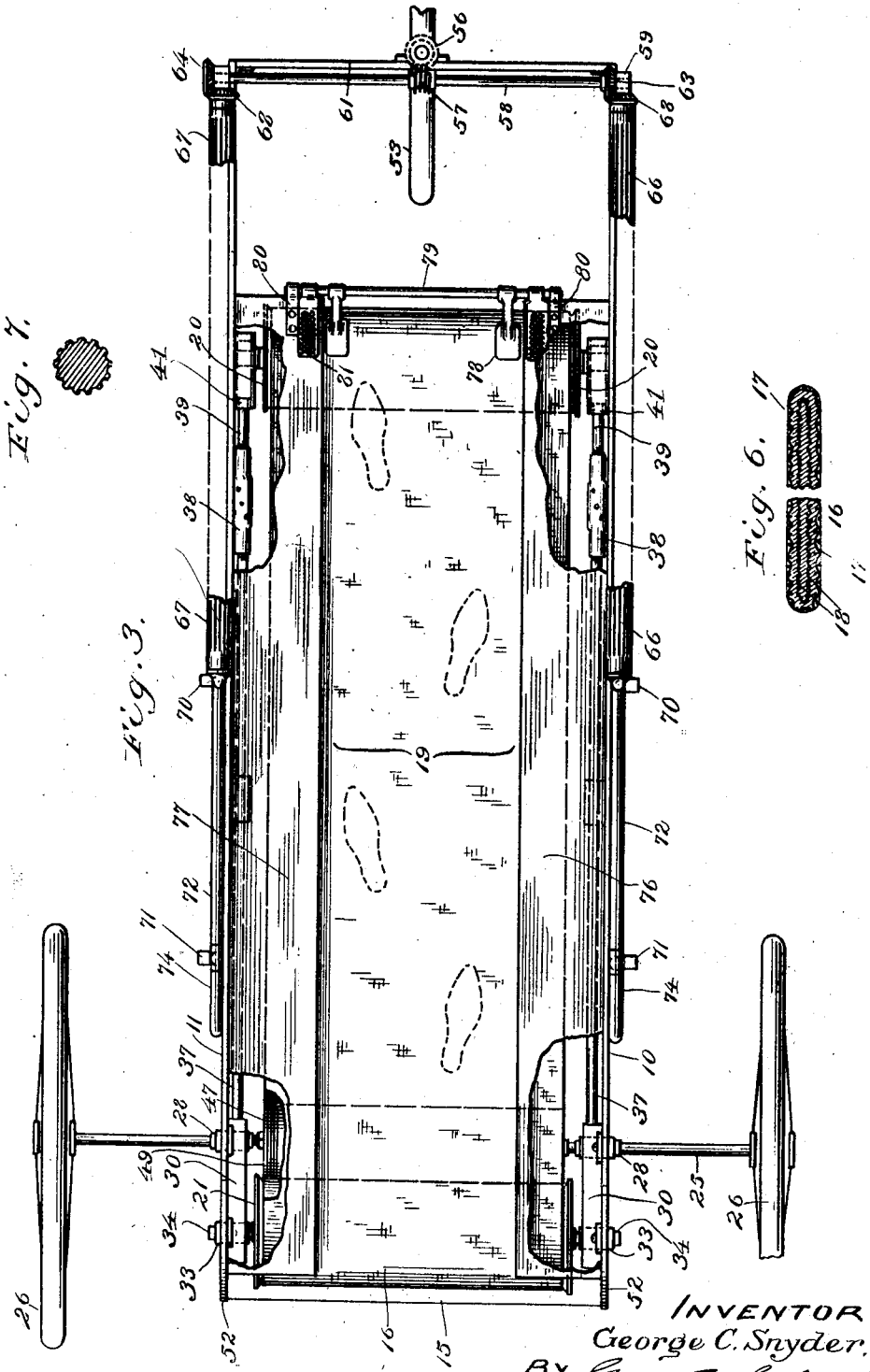
INVENTOR
George C. Snyder.
BY Geo. F. Wheelock
ATTY.

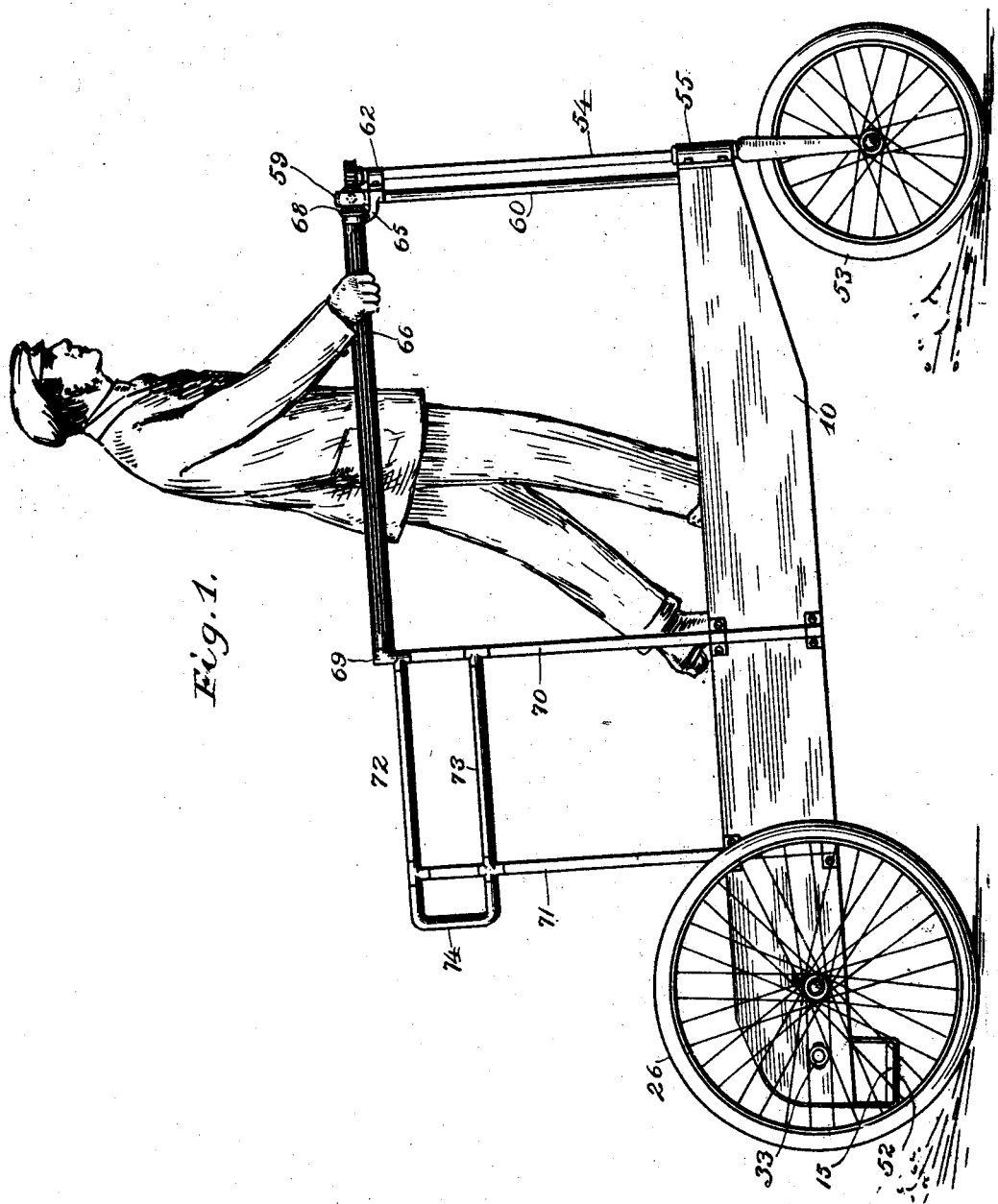

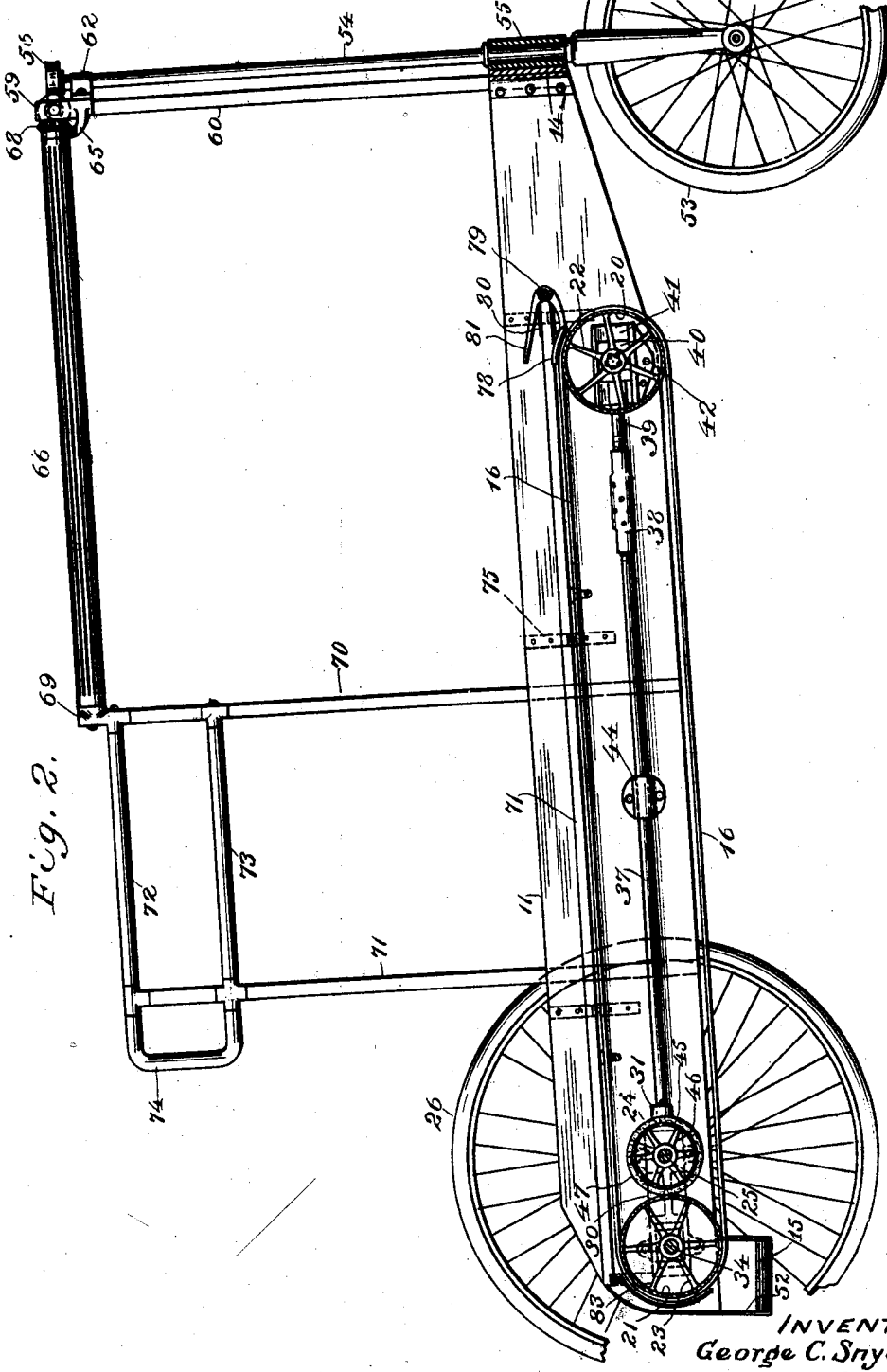

Jan. 1, 1929.
G. C. SNYDER
VEHICLE
Original Filed Feb. 25, 1922   4 Sheets-Sheet 4
1,696,927
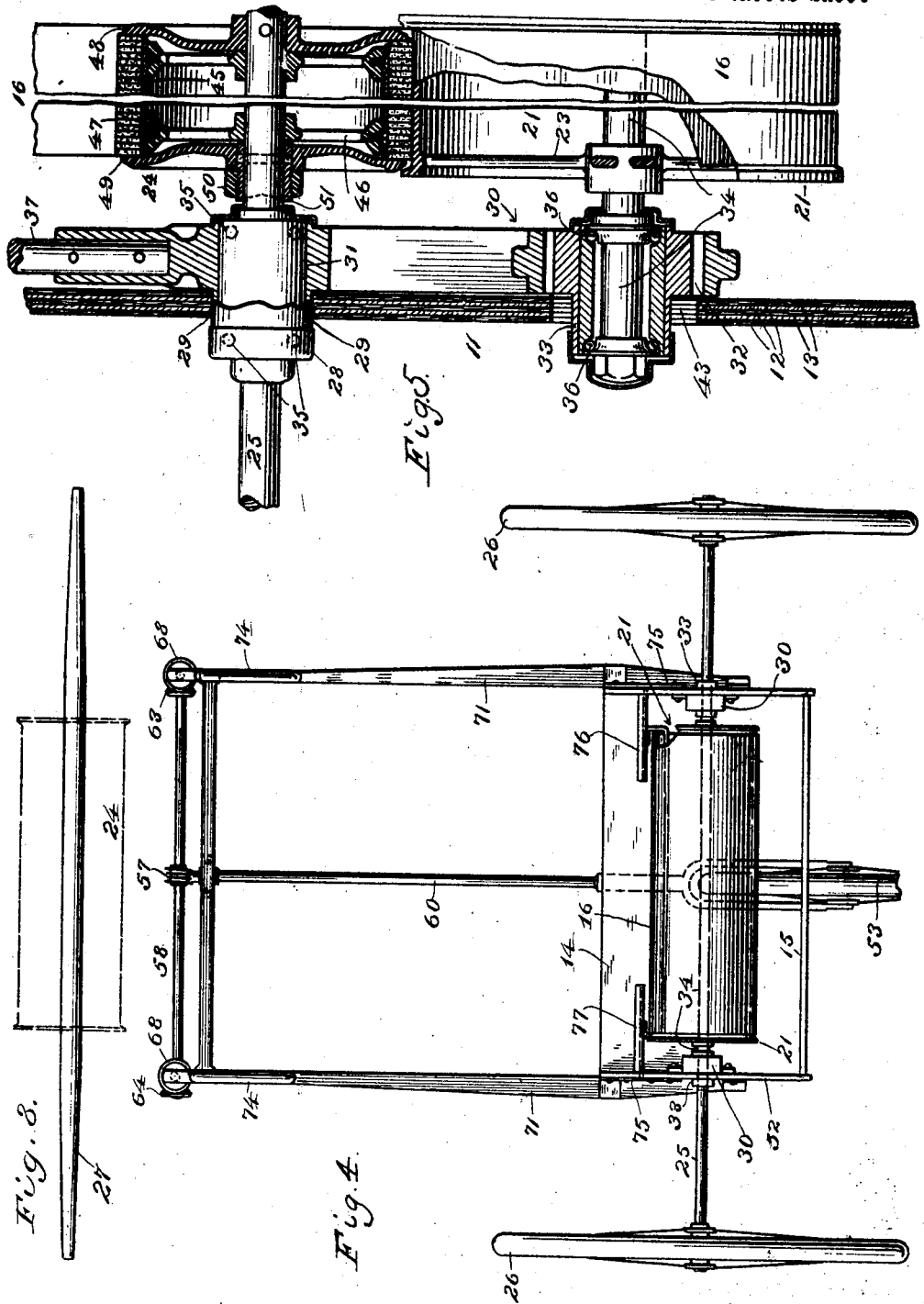
INVENTOR
George C. Snyder
By Geo. L. Wheelock
ATTY Patented Jan. 1, 1929.

1,696,927

UNITED STATES PATENT OFFICE.

GEORGE C. SNYDER, OF LONG ISLAND CITY, NEW YORK.

VEHICLE.

Application filed February 25, 1922, Serial No. 539,213. Renewed May 19, 1928.

This invention relates to that type of vehicles which is provided with propelling means for propelling the same, and an object of the invention is to provide a vehicle which when used on land may be said to be a cross or compromise between an automobile and a bicycle. The improved vehicle is also cheap and inexpensive as compared with an automobile, and possesses at least some of the capacity for pleasure of an automobile,—although in another field—and it is also adapted not only for carrying a passenger in addition to the rider, but by reason of the construction of its parts and its capacity it is better adapted for carrying packages or the like than a bicycle. Other objects of the invention are to provide an efficient and comparatively simple power-driven vehicle, which is preferably provided with a friction gear transmission operable by a tread-belt, suitable steps or the like to enable a person to mount the tread-belt when it is in motion and for a rider to stand on as for instance when coasting, and other convenient means and accessories tending to the comfort of the rider or operator of the vehicle.

These being among the objects of the present invention the same consists of certain features of construction and combinations of parts to be hereafter described and then claimed with reference to the accompanying drawings illustrating a desirable embodiment of the invention, and in which:

Fig. 1 is a side elevation of the vehicle showing a rider in position thereon for operating it;

Fig. 2 is a sectional side elevation showing the power means;

Fig. 3 is a plan, on which are dotted representations of the feet of two riders to indicate that one or more riders may operate the vehicle;

Fig. 4 is a rear elevation;

Fig. 5 is an enlarged detail view, parts being broken away, showing the construction of the power-transmitting means;

Fig. 6 is a detail showing in section the preferred construction of tread-belt for operating the vehicle;

Fig. 7 is a sectional detail of one of the steering handles; and

Fig. 8 is a view, partly in elevation and partly in broken lines, illustrating a modification.

Referring to the drawings, the vehicle frame or chassis preferably comprises two stringers or side-boards 10, 11, arranged in vertical planes, and being preferably composed of alternate layers 12, 13 of veneer or ply-board, in which the grain of the layers 12 runs longitudinally of the vehicle, while the grain of the layers 13 runs crosswise, all the layers being preferably secured together by glue. This ply-board construction is clear from Fig. 5. The vehicle frame also comprises a front cross-piece 14, also of veneer or ply-board, and at the rear, a transverse mounting step 15 forming a connecting crosspiece. A power-driven vehicle having a veneer or ply-board construction such as mentioned not only possesses considerable strength and endurance, but tends to lightness. It will be seen also that with the plyboard construction the stringers may have a minimum amount of thickness with a maximum amount of strength.

The driving element of the improved vehicle preferably consists of a tread-belt 16, a detail of which is shown in Fig. 6. The preferred tread-belt employed is similar to the composite belts which are frequently used, as a belting only, for transmitting power from one member to another member in power-transmission machinery. Such a tread-belt comprises longitudinal lengths of fabric 17, constituting tension-resisting material, and layers 18 of rubber or other soft cementing material. The layers of cementing material employed are between the lengths or layers of fabric 17, not only this, but the cementing material, when soft and before it hardens, will exude through the meshes of the fabric and coat the surfaces of the belt. The edges of the tread-belt would also be finished in similar manner to such known belting, as shown in Fig. 6, so that selvages are provided. A tread-belt of such character will provide on the outer surface of the belt a tread-way 19, which extends along the intermediate longitudinal portion thereof. The tread-way 19 being preferably composed of tension-resisting material coated with a soft water-proof material, such as rubber, furnishes a good friction surface to be engaged by the feet of the rider of the vehicle.

For practical purposes, it is believed that a treadway on a tread-belt should be free of facial obstructions, so as to offer to the operator a smoother, cleaner and better footing than the best-kept sidewalk, and such tread-belt should also be weather- and water-proof and composed of material of great strength and durability, and with a tread surface which will prevent undue slipping of the operator's feet. The described belting, now used in this vehicle as a tread-belt, is commonly used under relatively enormous tensions for power-transmission in locations where weather, fuels, dust, grime and acids are at the worst, and it will not sag, stretch or fray under the tread-load which is proposed under the present invention. A tread-belt such as described requires no slats or similar attachments to the same to provide a friction hold on the belt.

The preferred construction of transmission associated with the tread-belt will now be described. The belt 16 is trained over a front drum 20 and a rear drum 21, which drums preferably consist of metallic cylinders, preferably steel, within which are spiders or spokes 22 for the front drum, and 23 for the rear drum. The rear drum 21 preferably constitutes a primary driving gear-member in operative connection with an axle or propeller-shaft, and drum 24 constitutes a secondary gear-member driven by the drum 21. Preferably, the primary gear-member 21 and the secondary gear-member 24 consists of drums in frictional contact, so as to provide a friction drive. The rear axle or driven shaft 25 on which the secondary gear-member 24 is mounted carries the propeller or traction-wheels 26, as shown more clearly in detail in Fig. 5. Fig. 8 shows a hollow axle or driven shaft 27, which is tapered at both ends, and which is probably the kind of axle which will be used in practice, and which supports the secondary gear-member 24, which is indicated in broken lines. As specifically shown, the distance from the axis of the shaft 25 to the rear bight of the tread-belt is equivalent to one-half the diameter of the secondary drum plus the diameter of the primary drum.

Again referring to Fig. 5, casings, boxes, or hubs 28 are placed on both ends of the axle or shaft 25. The stringers 10, 11 are provided with openings 29, through which the axle or shaft 25 passes, and adjacent the inner walls of the stringers are arranged heads 30 having openings 31 for receiving the casings or boxes 28, which are fitted tightly therein, the same being also fitted tightly in the stringer openings 29. To the rear of the axle or shaft 25 the heads 30 are provided with openings 32, in which are slidably fitted the casings, boxes or hubs 33 for the shaft 34 of the primary drum 21. The casings or boxes 28, 33, respectively, contain ball or rolling bearings 35, 36. These antifriction bearings in a properly constructed transmission will enable the tread-belt to run freely, so that the latter is much more readily operable. Rolling bearings should also be provided for the forward drum 20.

The heads 30 with other parts now to be described, constitute a transmission frame, so arranged and constructed that the transmission is entirely supported on its own frame in the preferred form of the invention. Extending forwardly from the heads 30 are parallel rods 37 rigidly secured to the heads, and these rods extend along the adjacent inner surfaces of the stringers and are connected by means of turnbuckles 38 with short alined rods 39. See Figs. 2 and 3. The short rods 39 are mounted rigidly on heads 40, which are adapted to be slid on guide-pieces 41, secured as by pivots 42, to the inner surfaces of the stringers, thereby allowing the guide-pieces to be tilted slightly. The turnbuckles and concomitant parts constitute a belt-tightener, in addition to forming parts of a transmisison frame. As the tread-belt is tight upon the drums 20, 21, a smooth, easy running movement is imparted to the transmission to drive the propeller-wheels, and if the belt should become loose from use, it may be readily tightened up, for the heads 40 have a sliding connection with the guide-pieces 41 rigidly mounted on the stringers. Inasmuch as the primary member or drum 21 may slide slightly relatively to the heads 30 and the stringers, it is obvious that, when the belt is tight, the primary member or drum 21 will be brought in firm frictional contact with the secondary member or drum 24. For the purpose of having a sliding connection between the primary member 21 and the stringers, the latter are provided with longitudinal slots or openings 43 in which the casings or hubs may have a sufficient sliding motion. For guiding the rods 37 of the transmission frame on the main frame of the vehicle, the latter may be provided with guides 44 secured to the inner surfaces of the stringers, said rods being adapted to be moved in said guides, which also act as stabilizing means for the transmission frame.

The secondary gear-member or drum 24 is preferably specially constructed for frictional engagement with the primary gear-member 21 as shown clearly in Fig. 5. It is believed advisable to provide the secondary gear-member with a soft contact face than the primary gear-member, and to that end the secondary gear-member may be constructed as follows: A cylindrical hollow body 45 of suitable metal, as steel, is provided with spokes or spiders 46 for securing said cylindrical body to the shaft 25. Rings or collars, or spiral wrappings, 47, of fibre or other suitable material relatively softer than hard metal, are provided. The openings in the rings are of such size that they may be forced on to the cylindrical body 45, on which they fit snugly. If rings are used they are preferably driven on to the cylindrical body, one following the other, so that they are in contact at their adjacent faces, said rings extending over the entire length of the cylindrical body. A clamping flange or disk 48 is fixed rigidly to the shaft 25, and the soft rings 47 are pushed along until the first of them is brought in contact with the inner face of disk 48, which is of greater diameter than that of the cylindrical body 45. At the other end of the cylindrical body there is arranged another, similar, clamping flange or disk 49, which is movable longitudinally of the axis of the cylindrical body 45, and which may be adjusted and tightened up against the innermost soft ring 47. To this end, a nut 50 is screwed on to a screw-threaded portion 51 fixed rigidly on the shaft 25. The nut 50 may be turned up against the flange or disk 49, thereby acting to tighten the same upon the soft rings 47 and to compress them together to the desired extent. The soft rings or collars 47 are shown as being of similar dimensions, but it is evident that these may be varied. When the hard surface of the primary drum turns in frictional contact with the softer outer surface of the secondary drum, it is obvious that several advantages are gained, an important one of which is the elimination of noise and attrition action.

Step 15 previously mentioned is preferably supported from the rear ends of the stringers 10, 11 by means of straps secured to the rear and under edges of the stringers, said straps being bent up into suitable shape to provide hangers 52, in which the step 15 may be secured so as to extend transversely of the vehicle frame. It will be seen that step 15 would then be located back of, and underneath, the primary drum 21, or under the rear end or bight of the tread-belt. So located, it provides a rear step for facilitating the mounting of the vehicle by a rider or passenger. As the rider or passenger steps on the rear step 15, he or she at the same time takes hold of the stationary rear hand-grips or handles (to be described) of the upper frame of the vehicle, and may then step either on to the rear end of the tread-belt 16 or upon the rear ends of the longitudinal steps or guards to be described. A prospective operator would probably step directly upon the tread-belt and then walk along the belt until in position for grasping the steering-handles to be described.

In advance of the propeller or traction-wheels 26, and preferably at the extreme front end of the vehicle frame, there is located a dirigible member or steering-wheel 53. Preferably, the dirigible member or steering-wheel is provided with an upright steering-post 54, which is adapted to be turned in one direction or the other in a bearing box 55 rigidly secured to the front cross-piece 14 of the vehicle frame. At the upper end of the steering-post 54 there is fixed a worm-gear 56, which is held in mesh with a worm 57 mounted on a transverse rock-shaft 58. Rock-shaft 58 is journaled in boxes 59 at the upper ends of a stanchions 60 that rise from the forward ends of the stringers 10, 11 and are rigidly secured thereto. The upper ends of the stanchions 60 are secured together by a cross-piece 61, which carries a box 62 alined with the box 55, and in which the upper end of the steering-post 54 may turn. The rock-shaft 58 may be rotated in one or the opposite direction in order, through the medium of the worm-gears, to give a turning movement to the steering-post 54 and to the dirigible member or wheel 53 in one direction or the other, to steer the vehicle to the right or to the left.

For the purpose of imparting a turning movement to the rock-shaft 58, the ends thereof have bevel gears 63, 64 fixed thereon, preferably with the teeth facing in the same direction longitudinally of the rock-shaft. Adjacent the bevel gears 63, 64 brackets 65 are fixed to the upper ends of the stanchions 60, and in suitable bearings of these brackets turn the forward ends of hand-rails 66, 67, on which the bevel gears 68 are fixed to provide control means and mesh with the bevel gears 63, 64. The rear ends of the hand-rails 66, 67 are supported and adapted to be turned in bearings 69 of intermediate stanchions 70 secured rigidly to, and rising from, the stringers 10, 11. In the proportions shown, a rider of the vehicle who is treading the tread-belt will be positioned between the forward stanchions 60 and the intermediate stanchions 70, so that the handles or hand-rails 66, 67 may be grasped at approximately hand-high position above the tread-belt. The hand-rails, which constitute steering-handles, are preferably fluted or ribbed as shown in Fig. 7, so that a firm grasp of the handles may be obtained.

In case it is desired that two should ride the vehicle and operate the tread-belt, means should be provided for enabling the rear rider to hold himself in position. Preferably such means is stationary, and comprises rear stanchions 71 secured rigidly to the stringers 10, 11, and the upper ends of the rear stanchions 71 are connected rigidly with the intermediate stanchions 70 by means of two hand-rails 72, 73 at each side of the vehicle. These hand-rails 72, 73 provide stationary hand-holds to be grasped by a rider, the hand-rails 72 being the ones usually grasped, while the rails 73 are more for providing strength to the structure and as a convenient hand-grasp for a child. Located at each side of the vehicle behind the hand-rails 72, 73 is a hand-grip 74. These rear hand-grips 74 are in convenient location just above the rear step 15, so that even a small child could stand on the rear step and hold himself on the vehicle by grasping the hand-grips 74, and said hand-grips, of course, furnish convenient means for enabling a rider to mount from the step to the tread-belt. It will be seen that the stanchions 60, 70 and 71 and the rails supported thereby constitute a top frame on the vehicle, enabling a rider or riders to maintain a treading position on the tread-belt.

As the steering handles or rails 66, 67 extend lengthwise of the vehicle at fixed hand-high position at each side of a rider, so that they are in a plane substantially complementary to the plane of the tread surface of the belt, each may be rotated on its longitudinal axis to operate the locked steering wheel, and the feet and hands may be mutually employed principally to control the vehicle, without the danger of the use of the hands and feet together tending to confuse or throw the rider from a properly balanced and more or less natural walking position.

Means are preferably provided for supporting a rider in coasting, and also for guarding one or both edges of the tread-belt against the rider treading on such edge. These means preferably comprise straps 75 on the outer surfaces of the stringers, to which and the stringers longitudinal members 76, 77 are secured at the inner surfaces of the stringers. These longitudinal members 76, 77 are preferably at each side of the vehicle, and are preferably in the nature of boards or platforms which constitute foot-rests or steps, forming also guards for the edges of the tread-belt. These longitudinal members are preferably arranged slightly above the edges of the tread-belt, and they extend inwardly towards the longitudinal central portion of the tread-belt, so that the tread-belt is provided with the relatively narrow tread-way 19 before mentioned, between the adjacent inner edges of the longitudinal members. If the tread-way is not confined to an intermediate longitudinal portion of the tread-belt, the rider would be apt to tread upon the edges of the belt, which would yield so that the rider's feet might slip off the belt. By confining the rider's feet to the central longitudinal portion of the belt, the belt will stand up to its duty without over-tension and without sagging more than to act as means for absorbing the road shocks. The upper portions of the stringers 10, 11 of the chassis preferably project a sufficient distance above the foot rests or guards 76, 77 to confine the feet of the rider and prevent their being accidentally moved off of the vehicle.

If desired, means may be provided for applying a braking action to the tread-belt. Preferably the locking means are accessible to a foot of the rider, which may be used to actuate the brake while the rider is in the same or substantially the same position as when propelling the vehicle. Such means may consist of brake-shoes 78 mounted on a rock-shaft 79 journaled in brackets 80, said rock-shaft being provided with foot-pedals 81 whereby the brake-shoes may be applied to the belt. A fender 83 is shown adjacent the rear bight of the belt.

The advantages of the preferred construction of the device for a road vehicle provided with two propeller or traction-wheels and a steering-wheel may be summed up, at least partially, as follows: The primary driver is a rubber-surfaced endless tread-belt 16 having just enough yield to the rider's feet to give comfort, and at the same time the desired cling of the feet to the tread surface. The transmission, supported upon its own frame, and the tread-belt therefor may be operated by the tread of a plurality of riders simultaneously, the transmission being quite simple. With the traction-wheels at the rear and a dirigible wheel forward in a line centrally between the traction-wheels, a wheel-base is provided, which results in a three-point suspension of a tripod-like character, and it eliminates the need of various shock-absorbing parts that are indispensable to four-wheelers, especially where there are two driving members which rotate with the rear axle. The two hand-high steering-rails extending from front to rear or in the direction of travel of the vehicle, with one of them on each side of the rider or riders, perform two functions. They act to support the rider comfortably in tread position, and at the same time serve as a steering means. These rails 66, 67, by the construction shown and described, are rotatably mounted in positive connection with each other, and with the dirigible road-wheel. By the use of a worm 57, and a worm-wheel 56 mounted on the steering-post, a desirable condition results which is not found in other vehicles, in that the forward road or dirigible wheel 53 may be deflected through the rotation of the hand-rails and not otherwise, and the dirigible wheel 53 remains in the position where set. Said dirigible wheel 53 cannot wobble or change its direction except at the will of the operator, and this makes mounting and steering much easier. The vehicle may be built in various sizes and designs, as for one person only, for two or three, in tandem-tread, or it may have treading room for two, four or six persons in two-abreast formation.

The vehicle is adapted to park anywhere, and is always in instant readiness for service, as it might be said to be a sort of self-starter. In the preferred construction there is no duplication of any part of the transmission, and there is always the same, single, simple, powerful tread, and the more riders there are to operate the tread, the easier the vehicle goes. The described vehicle starts instantly and stops as suddenly, and goes fast or slow, as desired. The riders can remain aboard the vehicle when at a standstill, and they can change their positions, or any rider other than the driver can leave the vehicle easily and safely when it is in motion by stepping off the rear, and a rider can be picked up without stopping. The means for propulsion gives a smooth and steady flow of power, with no possible dead center, as in a bicycle, and under conditions which make for high efficiency, through the full weight of all the drivers being at all times available, in a natural forceful manner, as they tread the belt while they hold to the side rails and lean forward. The tread-belt sends the power to the propellers or traction-wheels through the simple and efficient transmission described, which carries it without the friction of chains and sprockets, and without demanding any uncomfortable position or unnatural leg movement of the operators. The lateral longitudinally-extending steering-rails give the needed support to the operator, not only when the vehicle is going straight away, but while taking curves or traveling in and out in the presence of other moving vehicles.

As to the details of the construction or the particular mechanism described, it is obvious that the invention is not otherwise restricted except as defined in the appended claims.

What I claim as new is:

1. In a vehicle, the combination of a frame having a propeller-wheel, a tread-driven belt for said wheel, a dirigible member, and steering-rails mounted at hand-high position at opposite sides of the frame and belt and separately manually-rotatable for steering the dirigible member.

2. In a vehicle, the combination of a frame, tread-belt means for propelling it, and steering means comprising two separately rotatable rails extending in approximately parallel relation with the belt and each other, a dirigible member, and gearing connecting the said rails with the dirigible member.

3. In a vehicle, the combination with a tread-belt for driving it, of a foot-rest above and substantially parallel with the belt.

4. In a vehicle, the combination with a tread-belt for driving it, of foot-rest platforms above and extending longitudinally of the edges of the belt.

5. In a vehicle, the combination with a chassis having a dirigible member, a propeller, gears mounted on the chassis, and a tread-belt operable on the gears for driving said propeller, of foot-rests substantially parallel with the belt and supported by the chassis above opposite edges of the belt, and confining the tread to an intermediate longitudinal portion of the belt.

6. In a vehicle, the combination with a chassis comprising side boards and having a dirigible member, a propeller, and a tread-belt for driving said propeller, of foot-rests supported by the chassis and located above the edges of the belt, the side boards of the chassis projecting above the foot-rests.

7. In a vehicle, a tread-belt, and means extending in a plane substantially parallel with the top lap of the belt to prevent treading on the edges of the belt.

8. In a vehicle, a tread-belt having an intermediate longitudinal tread-way, and means over each edge of the belt for the double purpose of confining the treading to the tread-way and for supporting the treader out of contact with the belt when coasting.

9. In a vehicle, a tread-belt, a hand-high rail thereabove, which has a fixed position relatively to the belt, and a rear handle to be grasped by the rider in mounting the belt.

10. A vehicle having a tread-belt, and a step disposed at one end thereof to facilitate mounting the belt when it is in motion.

11. In a vehicle, a rotatable drum, a tread-belt trained thereover, and a step below said drum at the end of said belt to facilitate mounting the belt when it is in motion.

12. In a vehicle, the combination of a tread-belt for propelling it, with means at one end of the belt for enabling a person to obtain a foot-hold on the upper lap of the belt when the belt is in motion, such means comprising a foot-rest platform located over and in proximity to the said upper lap, and a mounting step located below said platform and in proximity to said upper lap.

13. In a vehicle, the combination of a chassis having a propeller 26 and steering means, a contractible and expansible transmission frame mounted on the chassis, power transmission means supported on the transmission frame and operable on the propeller, and a tread-belt operable on the power transmission means for driving the same, said belt passing around the shaft of the propeller and adapted to be tightened through the transmission frame.

14. In a vehicle, the combination of a chassis having a propeller 26 and steering means, a transmission frame mounted entirely on the chassis, power transmission means supported entirely on the transmission frame and operable directly on the propeller, and a tread-belt operable on the power transmission means for driving the same.

15. In a vehicle, the combination of a chassis having a rear propelling wheel, power transmitting means having a driven member operating on the shaft of the wheel and located behind the shaft, a fender behind said driven member, and a step below the fender.

16. In a vehicle, a tread-belt for supporting the weight of an upright rider and for propulsion of the vehicle by the feet of the so-positioned rider, control means adjacent to the belt and accessible to a foot of the so-positioned rider while the rider is in substantially the same location as when propelling, and means furnishing a hand-hold for the rider when propelling or when operating the control means.

17. In a vehicle, means for supporting the weight of an upright rider and for propulsion of the vehicle by the feet of the so-positioned rider, handles having a fixed hand-high position above the supporting and propulsion means, and control means associated with the handles for operation by the hands of the rider.

18. In a vehicle, a tread-belt for a rider to walk on, hand-high handles above the belt extending longitudinally of the vehicle, and control means associated with the handles for operation by a hand of the rider when in walking position.

GEORGE C. SNYDER.